(12) United States Patent
Li et al.

(10) Patent No.: US 6,522,467 B1
(45) Date of Patent: Feb. 18, 2003

(54) POLARIZATION INSENSITIVE LIQUID CRYSTAL TUNABLE FILTER

(75) Inventors: Yiqiang Li, San Jose, CA (US); Yongjian Wang, Saratoga, CA (US)

(73) Assignee: AC Photonics, Inc., Santa Clara, CA (US)

( * ) Notice: Subject to any disclaimer, the term of this patent is extended or adjusted under 35 U.S.C. 154(b) by 0 days.

(21) Appl. No.: 09/961,044

(22) Filed: Sep. 21, 2001

(51) Int. Cl.[7] .......................... G02B 5/30; G02B 27/00; G02F 1/1335
(52) U.S. Cl. ...................... 359/484; 359/494; 359/498; 359/500; 359/578; 359/579; 359/900; 349/18; 349/198
(58) Field of Search ................................ 359/484, 494, 359/497, 498, 500, 577, 578, 579, 900; 349/18, 193, 198

(56) References Cited

U.S. PATENT DOCUMENTS

| | | | | |
|---|---|---|---|---|
| 5,111,321 A | * | 5/1992 | Patel | 349/128 |
| 5,321,539 A | * | 6/1994 | Hirabayashi et al. | 349/1 |
| 5,710,655 A | * | 1/1998 | Rumbaugh et al. | 359/249 |
| 6,075,647 A | * | 6/2000 | Braun et al. | 356/416 |
| 6,081,367 A | * | 6/2000 | Yokoyama et al. | 359/337.2 |

* cited by examiner

Primary Examiner—John Juba, Jr.
(74) Attorney, Agent, or Firm—Sawyer Law Group LLP (57) ABSTRACT

A method and system for filtering an optical signal is disclosed. The method and system comprise providing a polarization beam splitter, first and second rotators, a liquid crystal tunable filter, and first and second prisms. The polarization beam splitter splits the optical signal into two components based on polarization. The first rotator rotates a polarization 45 degrees in a first direction and is located between the liquid crystal tunable filter unit and the polarization beam splitter. The liquid crystal tunable filter unit includes liquid crystal molecules aligned 45 degrees clockwise relative to the vertical direction and is placed between the first rotator and the second rotator. The second rotator rotates the polarization 45 degrees opposite to the first direction. The first prism is located near the second rotator, while the second prism is near the beam splitter. One component travels from the beam splitter to the first rotator, the liquid crystal tunable filter unit, the second rotator, the first prism, then the second prism. The other component travels from the beam splitter to the first prism in the opposite direction from the first component. Both components preferably pass through the same portion of the liquid crystal tunable filter unit.

13 Claims, 8 Drawing Sheets

POLARIZATION INSENSITIVE LIQUID CRYSTAL TUNABLE FILTER

FIELD OF THE INVENTION

The present invention relates to optical systems, and more particularly to a method and system for providing a liquid crystal filter that is insensitive to the polarization of the light.

BACKGROUND OF THE INVENTION

Figure 1:
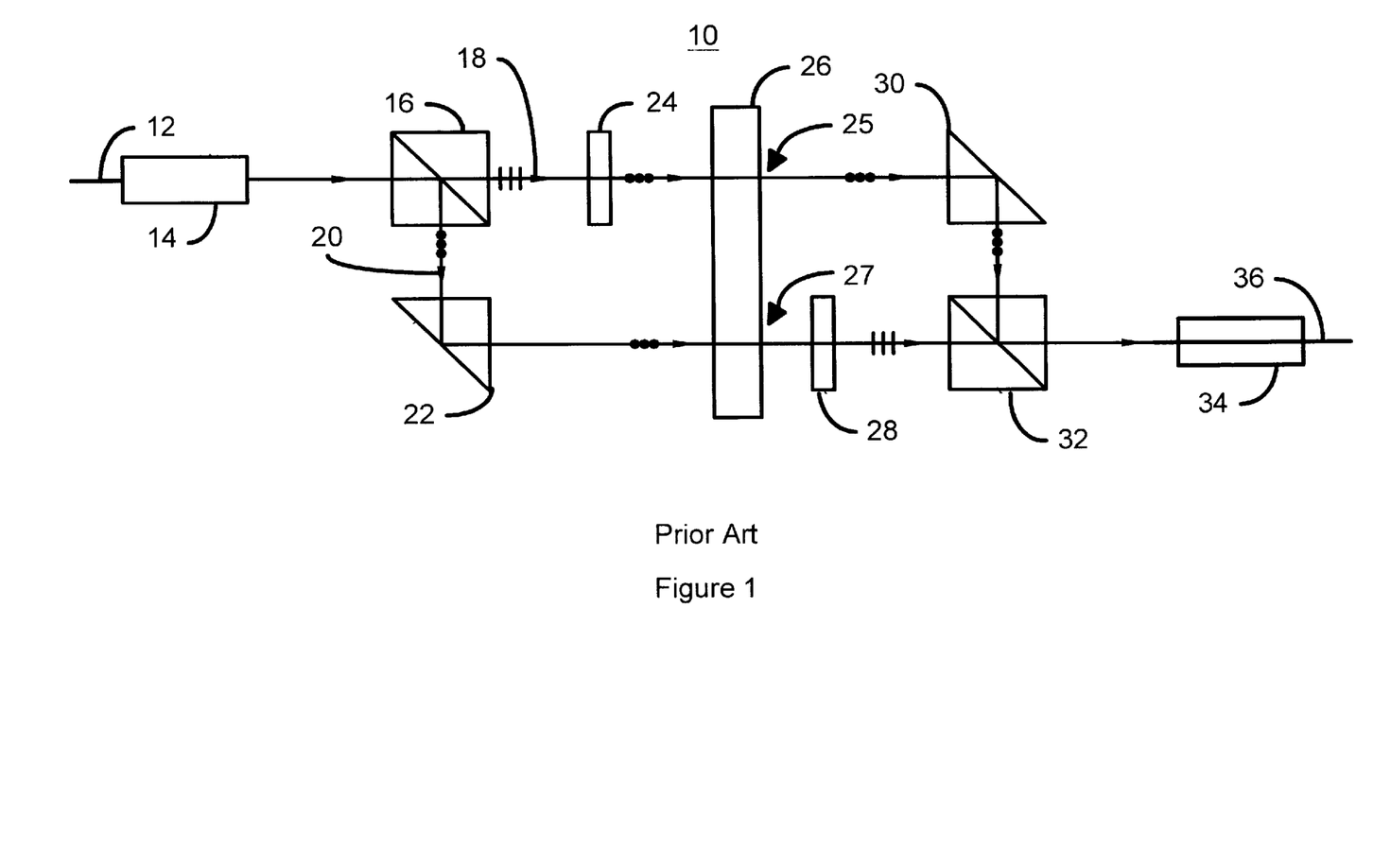
FIG. 1 is a diagram of a conventional system for filtering an optical signal using a liquid crystal tunable filter.

Polarization insensitive liquid crystal tunable filters are used to filter particular wavelengths of light. FIG. 1 depicts one such conventional polarization insensitive liquid crystal tunable filter system 10. This conventional system 10 includes an input signal 12 provided on a fiber, a single fiber collimator 14, a first polarization beam splitter 16, a first right angle prism 22, a first half wave plate 24, a conventional liquid crystal filter unit 26, a second half wave plate 28, a second right angle prism 30, a second polarization beam splitter 32 and a second single fiber collimator 34 that provides an output signal 36. The first polarization beam splitter 16 splits the input optical signal 12 into two polarization components 18 and 20 with parallel and perpendicular polarization direction relative to the plane of the page, respectively. The first component 18 is transmitted through the first half wave plate 24 with its polarization rotated 90 degree, filtered by the conventional liquid crystal tunable filter unit 26 at region 25, then reflected by the second right angle prism 30 to the second polarization beam splitter 32 and then reflected to the output. Similarly, the second component 20 is reflected by the first right angle prism 22, filtered by the conventional liquid crystal tunable filter unit 26 at region 27 and then transmitted through the second half wave plate 28 with its polarization rotated 90 degree. Then the second component 20 is provided to and transmitted by the second polarization beam splitter 32. Thus, the first component 18 and the second component 20 are recombined to a single optical signal and output as conventional filtered optical signal 36 through single fiber collimator 34.

Figure 2A:
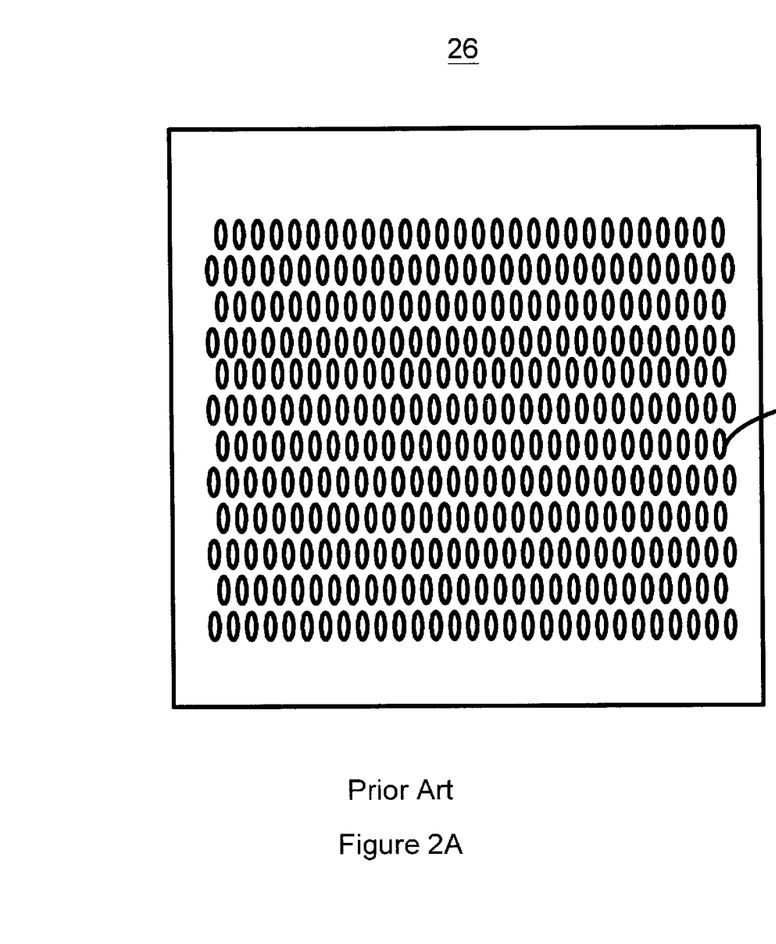
FIG. 2A is a more detailed front view of the conventional liquid crystal tunable filter unit.
Figure 2B:
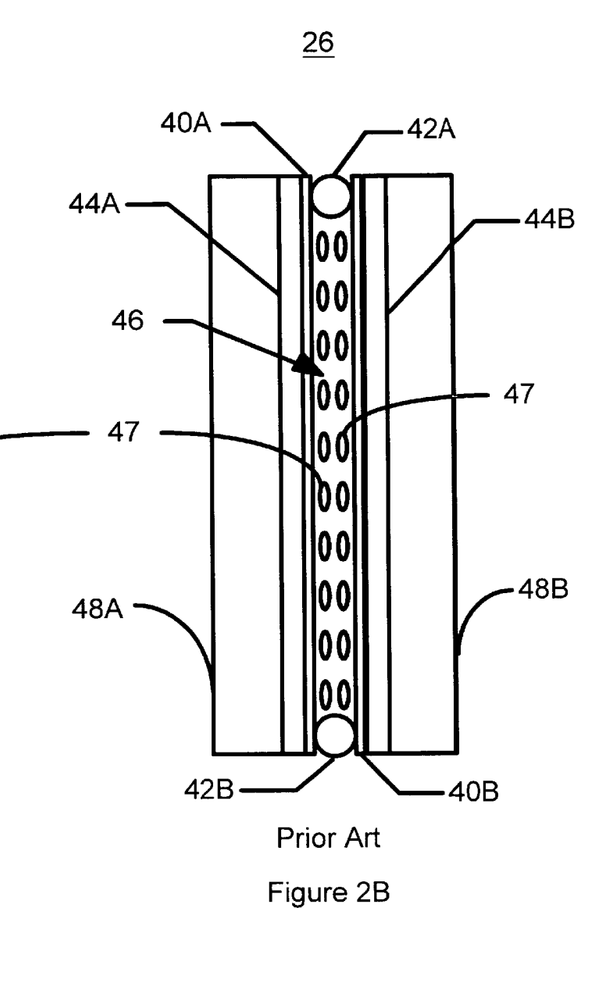
FIG. 2B is a more detailed side view of the conventional liquid crystal tunable filter unit.

FIGS. 2A and 2B depict front and side views, respectively, of the conventional liquid crystal tunable filter unit 26, which includes two glass slides 48A and 48B two transparent electrodes 44A and 44B, high reflective coatings 40A and 40B, liquid crystal 46 and spacers 42A and 42B. The two spacers 42A and 42B set the distance between the high reflective coatings 40A and 40B. The elliptical shaped liquid crystal molecules 47 are aligned in the vertical direction and can be oriented clockwise or counter clockwise with the voltage applied on the electrode 44A and 44B. Since the polarization direction of first component 18 and second component 20 are aligned with that of liquid crystal at regions 25 and 27, both components 18 and 20 experience a refractive index or optical phase delay change with the changes of voltage applied on the electrode 44A and 44B. The optical phase delay change for both components 18 and 20 provides center wavelength tuning on the combined optical signal 36.

Although the conventional liquid crystal tunable filter system 10 functions, one of ordinary skill in the art will readily recognize that there are drawbacks. In particular, the conventional liquid crystal tunable filter system 10 has a polarization separation in its transmitted spectrum. Because of the glass slides 48A and 48B are not perfectly parallel, the thickness of the liquid crystal 46 varies across the length of the conventional liquid crystal tunable filter unit 26. In addition, the density of the liquid crystal 46 may vary-across the length of the liquid crystal tunable filter. Furthermore, as depicted in FIG. 1, the first component 18 and the second component 20 pass through the conventional liquid crystal tunable filter unit 26 at different positions 25 and 27. As a result, the first component 18 and the second component 20 can experience different thicknesses and densities of liquid crystal that introduce a difference on the optical phase delay of the components 18 and 20.

Figure 3:
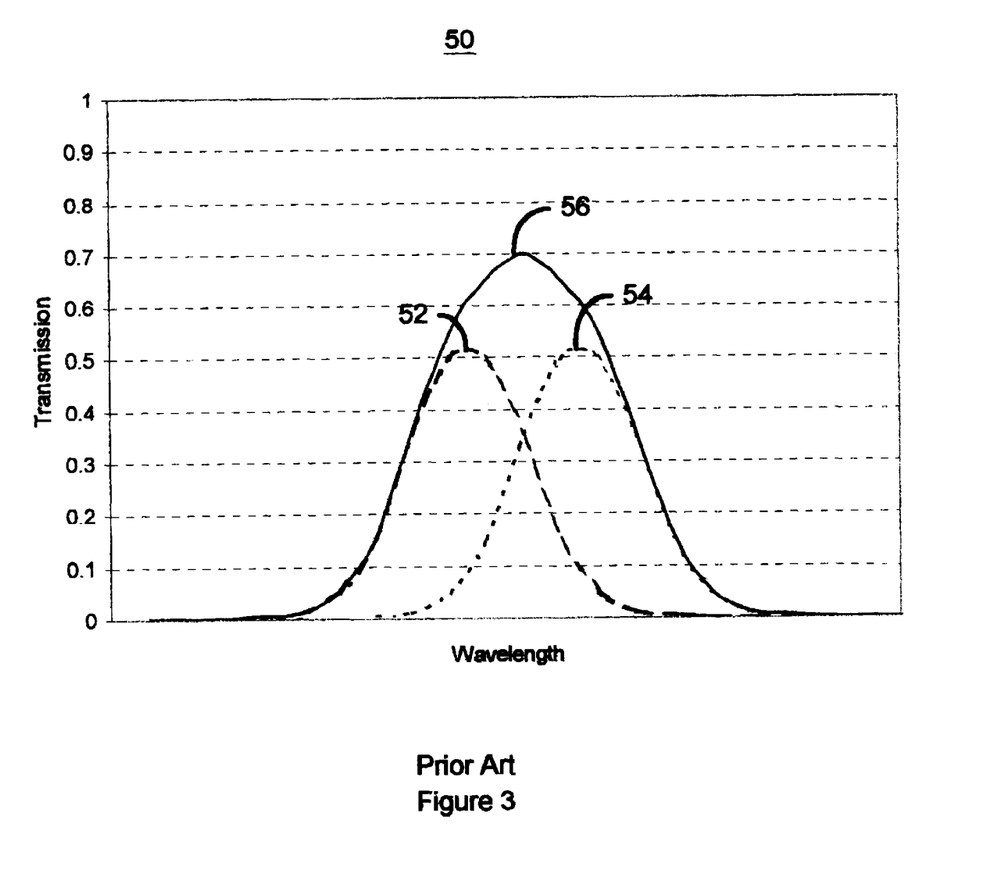
FIG. 3 is a diagram of the transmission spectrum for the conventional system for filtering an optical signal using the liquid crystal tunable filter unit.

FIG. 3 is a graph 50 depicting the spectra 52, 54 and 56, respectively, for the components 18 and 20 and the output signal 34. The difference in their optical phase delay makes the optical spectra 52 and 54 of the transmitted first component 18 and the second component 20, respectively, separated and the optical spectrum 56 of the output signal 36 broadened with a higher insertion loss. This optical spectrum separation between first and second component 18 and 20 is called "polarization spectrum separation", which makes the conventional liquid crystal tunable filter system 10 have the following the drawbacks: a relatively high insertion loss, an increased polarization dependent loss and a broadened width for the pass band.

Accordingly, what is needed is a system and method for providing a liquid crystal filter system that is insensitive to the polarization of light. The present invention addresses such a need.

SUMMARY OF THE INVENTION

The present invention provides a method and system for filtering an optical signal. The method and system comprise providing a polarization beam splitter, first and second rotators, a liquid crystal tunable filter unit, and first and second prisms. The polarization beam splitter splits the optical signal into a first component having a first polarization and a second component having a second polarization. The first rotator rotates a polarization 45 degrees in a first direction, receives the first component from the beam splitter and is located between the liquid crystal tunable filter unit and the polarization beam splitter. The liquid crystal molecules of the liquid crystal tunable filter unit are aligned 45 degrees relative to a vertical direction. The liquid crystal tunable filter unit receives the first component from the first rotator, provides the second component to the first rotator and is between the first rotator and the second rotator. The second rotator rotates the polarization 45 degrees opposite to the first direction, receives the first component from the first rotator and provides the second component to the liquid crystal tunable filter unit. The first prism is located in proximity to the second rotator, receives the first component from the second rotator and provides the second component to the second rotator. The second prism is in proximity to the beam splitter, receives the first component from the first prism and provides the second component from the first beam splitter to the first prism.

According to the system and method disclosed herein, the present invention provides a liquid crystal tunable filter system that is insensitive to the polarization of the input signal.

DETAILED DESCRIPTION OF THE INVENTION

The present invention relates to an improvement in polarization insensitive liquid crystal filters. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for filtering an optical signal. The method and system comprise providing a polarization beam splitter, first and second rotators, a liquid crystal tunable filter unit, and first and second prisms. The polarization beam splitter splits the optical signal into a first component having a first polarization and a second component having a second polarization. The first rotator rotates a polarization 45 degrees in a first direction, receives the first component from the beam splitter and is located between the liquid crystal tunable filter unit and the polarization beam splitter. The liquid crystal molecules of the liquid crystal tunable filter unit are aligned 45 degrees relative to a vertical direction. The liquid crystal tunable filter unit receives the first component from the first rotator, provides the second component to the first rotator and is between the first rotator and the second rotator. The second rotator rotates the polarization 45 degrees opposite to the first direction, receives the first component from the first rotator and provides the second component to the liquid crystal tunable filter unit. The first prism is located in proximity to the second rotator, receives the first component from the second rotator and provides the second component to the second rotator. The second prism is in proximity to the beam splitter, receives the first component from the first prism and provides the second component from the first beam splitter to the first prism.

The present invention will be described in terms of a particular system having a certain arrangement of particular components. However, one of ordinary skill in the art will readily recognize that this method and system will operate effectively for other systems and other components having a different arrangement that is consistent with the present invention. Furthermore, the present invention is described in the context of particular directions, such as vertical or horizontal directions. However, one of ordinary skill in the art will readily recognize that the present invention is consistent with other directions having analogous relationships.

Figure 4:
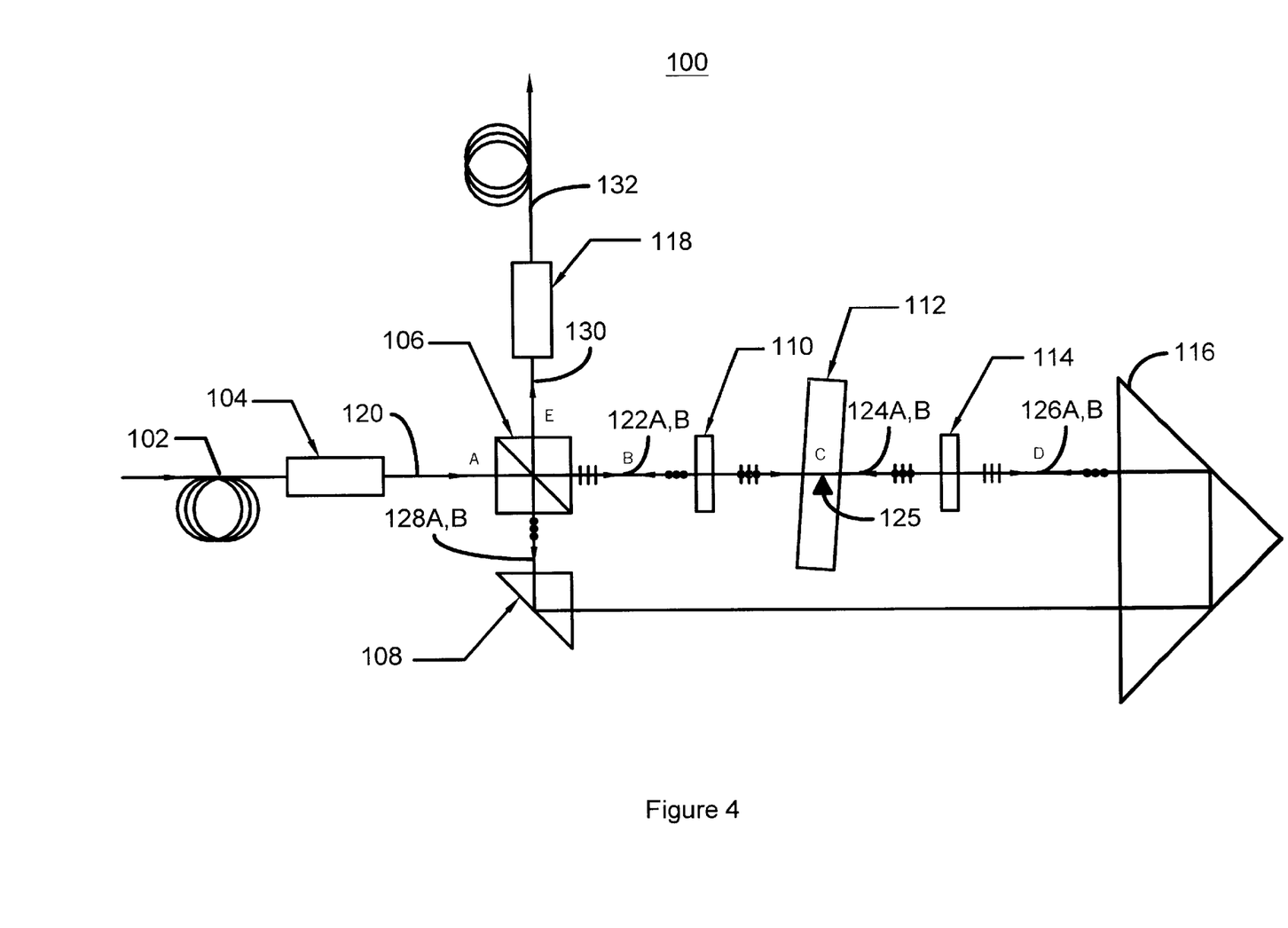
FIG. 4 is a diagram of one embodiment of a polarization insensitive system in accordance with the present invention for filtering an optical signal using a liquid crystal tunable filter unit.

To more particularly illustrate the method and system in accordance with the present invention, refer now to FIG. 4 depicting one embodiment of a polarization insensitive system 100 in accordance with the present invention for filtering an optical signal using a liquid crystal tunable filter unit. The polarization insensitive liquid crystal tunable filter system 100 has optical signal 102 input and outputs a filtered optical signal 132. The liquid crystal tunable filter system 100 includes a single fiber collimator 104, a polarization beam splitter 106, a rotator 110, a liquid crystal tunable filter unit 112, a second rotator 114, a first prism 116 and a second prism 108. The rotators 110 and 114 are preferably Faraday rotators. The rotator 110 rotates the polarization of a signal in a first direction by 45 degrees. The rotator 114 rotates the polarization of an optical signal in a second direction opposite to the first by 45 degrees. In a preferred embodiment, the first rotation direction is clockwise, while the second rotation direction is counter clockwise. The prisms 116 and 108 are preferably right angle prisms. Note that the optical signals, discussed below, preferably pass through the liquid crystal tunable filter unit 112 at the same point 125. The liquid crystal tunable filter unit 112 is preferably having its liquid crystal molecules be aligned 45 degrees relative to a vertical direction, as described below.

Figure 5A:
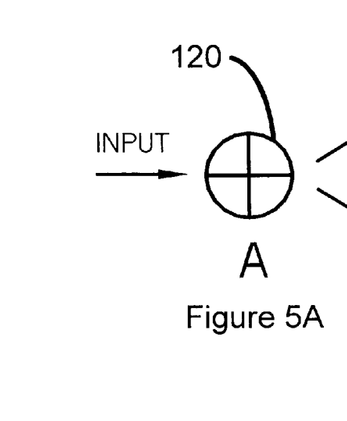
FIGS. 5A–5H are diagrams depicting how optical signals travel through the system in accordance with the present invention for filtering an optical signal using a liquid crystal tunable filter unit.
Figure 5B:
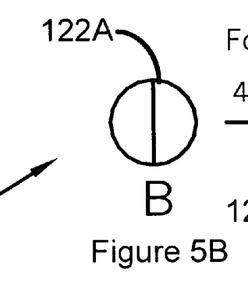
Figure 5C:
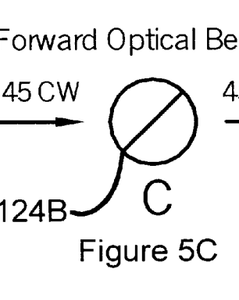
Figure 5D:
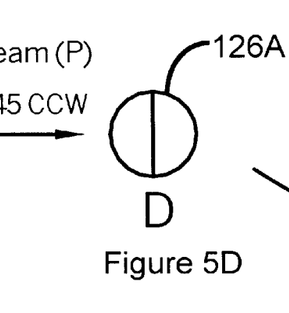
Figure 5E:
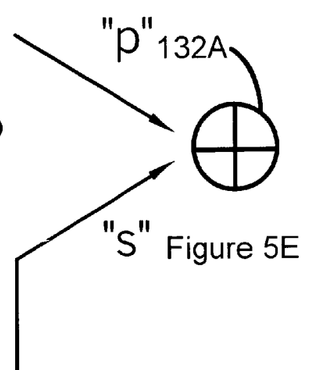
Figure 5F:
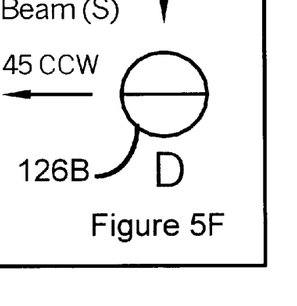

FIGS. 5A–5H are diagrams depicting how optical signals travel through the liquid crystal tunable filter system 100 in accordance with the present invention. Operation of the liquid crystal tunable filter system 100 in accordance with the present invention will be described using FIGS. 4 and 5A–5H. The optical signal 102 is input through the single fiber collimator 104. The optical signal is provided from the single fiber collimator 104 at signal 120. As shown in FIG. 5A, both the p (vertically polarized) and s (horizontally polarized) components of the optical signal are present in the signal 120. The optical signal 120 is then provided to the polarization beam splitter 106, which transmits the first, p, component 122A but reflects the second, s component 128A. The path of the first component 122A is described in conjunction with FIGS. 4 and 5B–5E. The first component 122A is vertically polarized, as shown in FIG. 5B, and transmitted undeflected by the polarization beam splitter 106. The first component then passes through the rotator 110 and has its polarization rotated by 45 degrees clockwise, then transmitted and filtered by the liquid crystal tunable filter unit 112 at point 125. Thus, the polarization is 45 degrees clockwise from vertical, shown in FIG. 5C as signal 124A. The first component 124A is rotated 45 degrees counter clockwise by the rotator 114. Thus, the polarization is again vertical as shown in FIG. 5D as signal 126A. The first component 126A is then reflected by the prism 116, then the prism 108. The prisms 108 and 116 change the direction of propagation for the first component 126A and offset the position of the first component 126A. Thus, the first component 128A (shown in FIG. 4) is and again provided to the first polarization beam splitter 106.

Figure 5G:
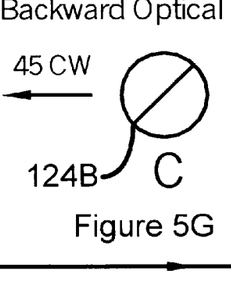
Figure 5H:
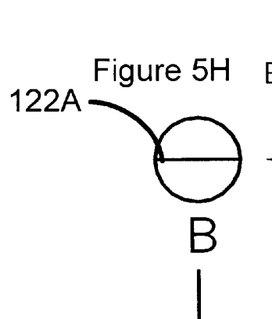

A portion of the signal 120 provided by the single fiber collimator 102 is reflected by the polarization beam splitter 106. This second component 128B is horizontally polarized, shown as perpendicular to the plane of the page in FIG. 4. The second component 128B is provided to the second prism 108 then to the first prism 116, which alter the direction of propagation for the second component 128B and offset the second component 128B. Thus, the resulting second component still has a horizontal polarization, as depicted as signal 126B in FIG. 5F. The second component 126B is provided to the second rotator 114, which rotates the polarization of the second component 126B by 45 degrees counter clockwise. Thus, the polarization of the second component 124B, shown in FIG. 5G, is the same as that of the first component 124A, shown in FIG. 5C, when the components are filtered by the liquid crystal filter unit 112. Furthermore, the components 124A and 124B pass through the liquid crystal tunable filter 112 at the same point. The second component 124B is provided to the first rotator 110, which rotates the polarization by 45 degrees clockwise. The resulting second component 122B again has a horizontal polarization. The second component 122B is again provided to the beam splitter 106. The second component 122B is reflected by the beam splitter 106. Thus, the first component 128A is combined with the second component 122B into signal 130. The combined signal 130 is output as signal 132 by the single fiber collimator 118.

Thus, the first and second components 124A and 124B, respectively, pass through the same portion 125 of the liquid crystal tunable filter unit 112. Preferably, the first and second components 124A and 124B pass through the liquid crystal tunable filter unit 112 at exactly the same area. The first and second components 124A and 124B, respectively, will thus experience the same density and thickness of liquid crystal. As a result, the optical polarization spectrum separation may be eliminated. Thus, polarization dependence of the system 100 due to the components 124A and 124B experiencing a different thickness of liquid crystal can be eliminated.

Figure 6:
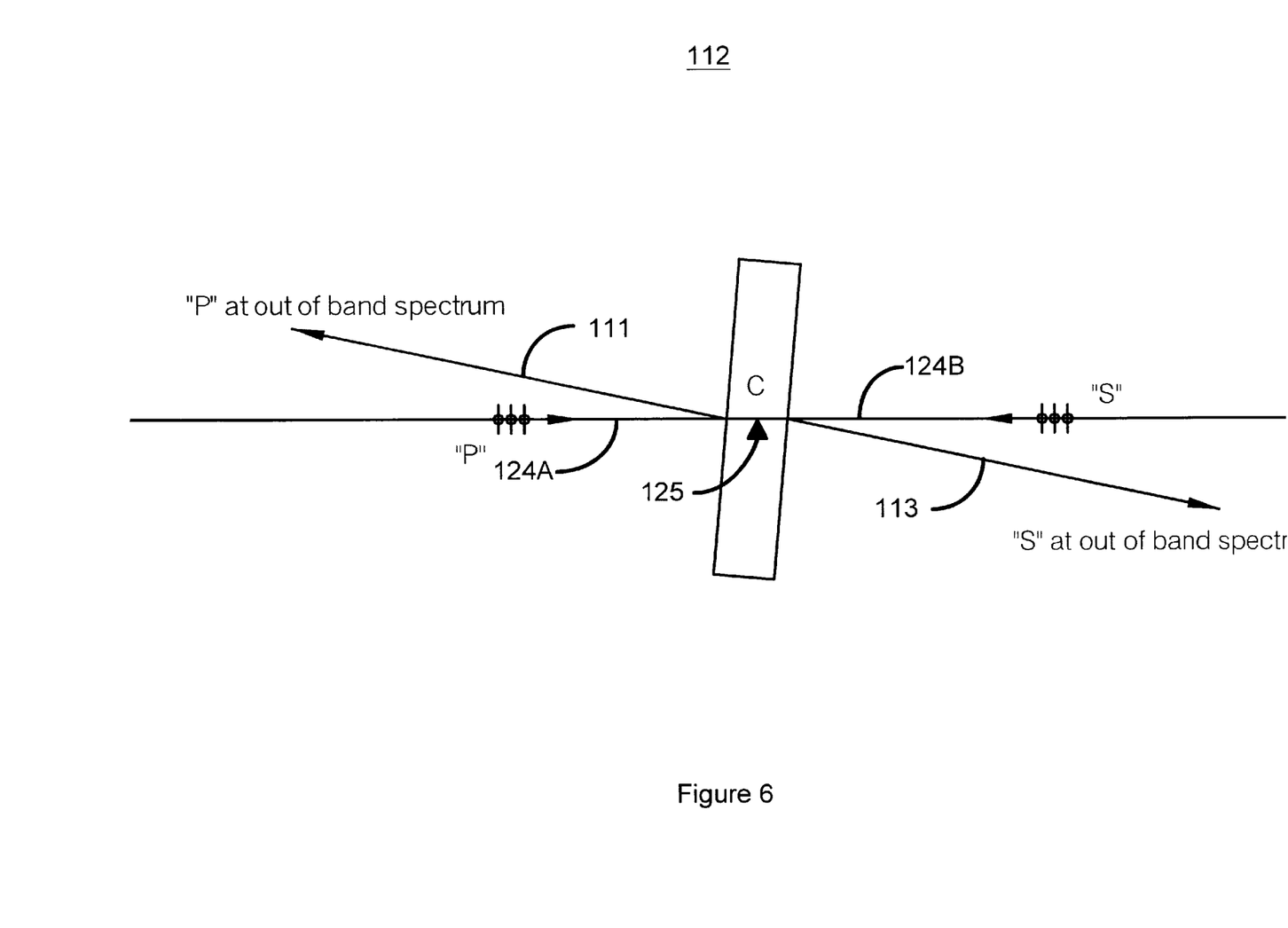
FIG. 6 is a diagram of one embodiment of a liquid crystal tunable filter in the system in accordance with the present invention.

In addition, the components 124A and 124B are preferably incident on the liquid crystal tunable filter unit 112 at a slight angle. FIG. 6 is a side view of one embodiment of a liquid crystal tunable filter unit 112 in the system 100 in accordance with the present invention. The components 124A and 124B are incident at a slight angle from normal to the surface of the liquid crystal tunable filter unit 112. This angle is preferably approximately 0.5 degrees. As a result, back reflections may be reduced or prevented. The out of the pass band spectrum 111 and 113 are thus prevented from being part of the output 132 of the system 100. Furthermore, the components 124A and 124B have the same polarization as they pass through the liquid crystal tunable filter unit 112. The components 124A and 124B are polarized at 45 degrees clockwise from vertical.

Figure 7A:
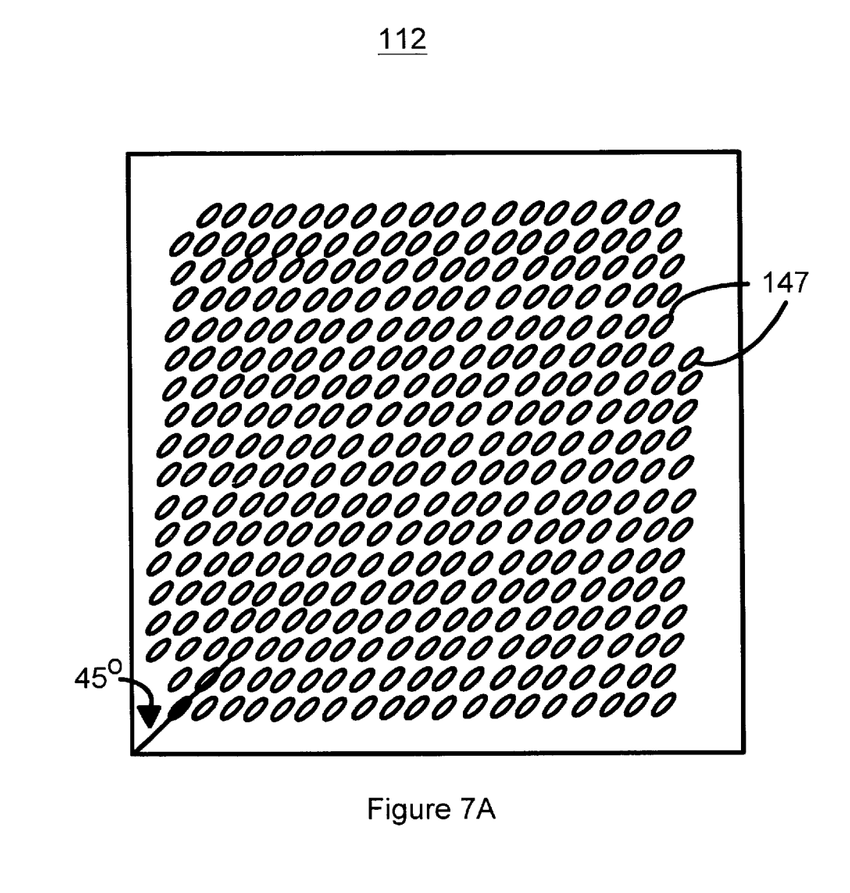
FIG. 7A is a front view of one embodiment of a liquid crystal tunable filter unit in the system in accordance with the present invention.
Figure 7B:
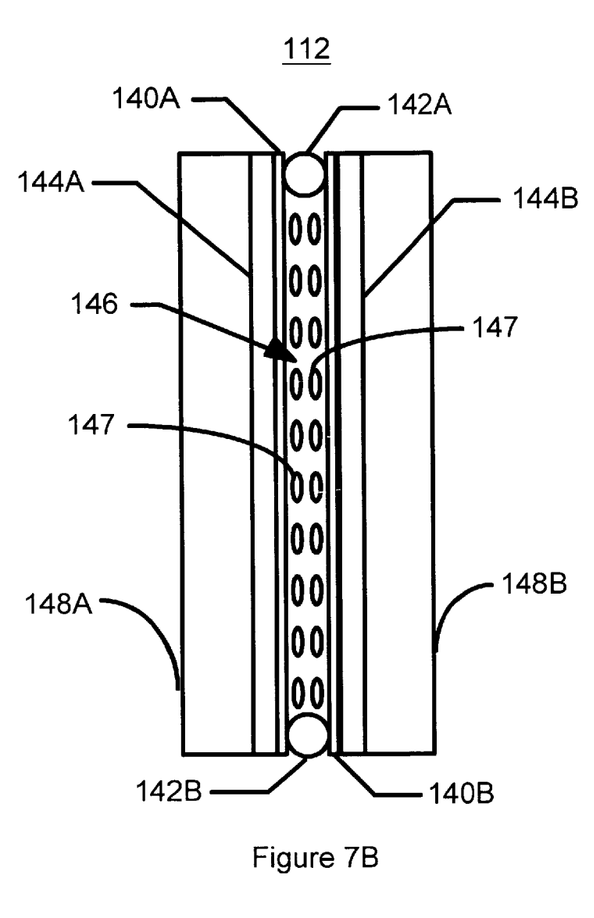
FIG. 7B is a side view of one embodiment of a liquid crystal tunable filter unit in the system in accordance with the present invention.

FIGS. 7A and 7B depict front and side views, respectively, of one embodiment of a liquid crystal tunable filter unit 112 in the system 100 in accordance with the present invention. The liquid crystal tunable filter unit 112 includes two glass slides 148A and 148B two transparent electrodes 144A and 144B, high reflective coatings 140A and 140B, liquid crystal 146 and spacers 142A and 142B. The two spacers 142A and 142B set the distance between the high reflective coatings 40A and 40B. Because of the non-perfection on the parallelism between glass slides 48A and 48B, the thickness of the liquid crystal 146 varies across the length of the liquid crystal tunable filter unit 112. In addition, the density of the liquid crystal 146 may vary across the length of the liquid crystal tunable filter unit 112. However, as discussed above, the components 124A and 124B preferably pass through the same point in the liquid crystal tunable filter unit 112. Consequently, problems due to differences in thickness and density can be reduced or eliminated.

Moreover, as can be seen in FIG. 7, the liquid crystal 146 has molecules 147 that are oriented at an angle, preferably 45 degrees, from vertical. This direction is the same as the direction of polarization for the components passing through the liquid crystal filter unit 112. Because the liquid crystal 146 is oriented at the angle and because the polarizations of the signals 124A and 124B are at 45 degrees, the liquid crystal tunable filter unit 112 treats the signals 124A and 124B similarly. Thus, the first and second components 124A and 124B will be subject to the same refractive index or optical phase delay from the liquid crystal 146.

Figure 8:
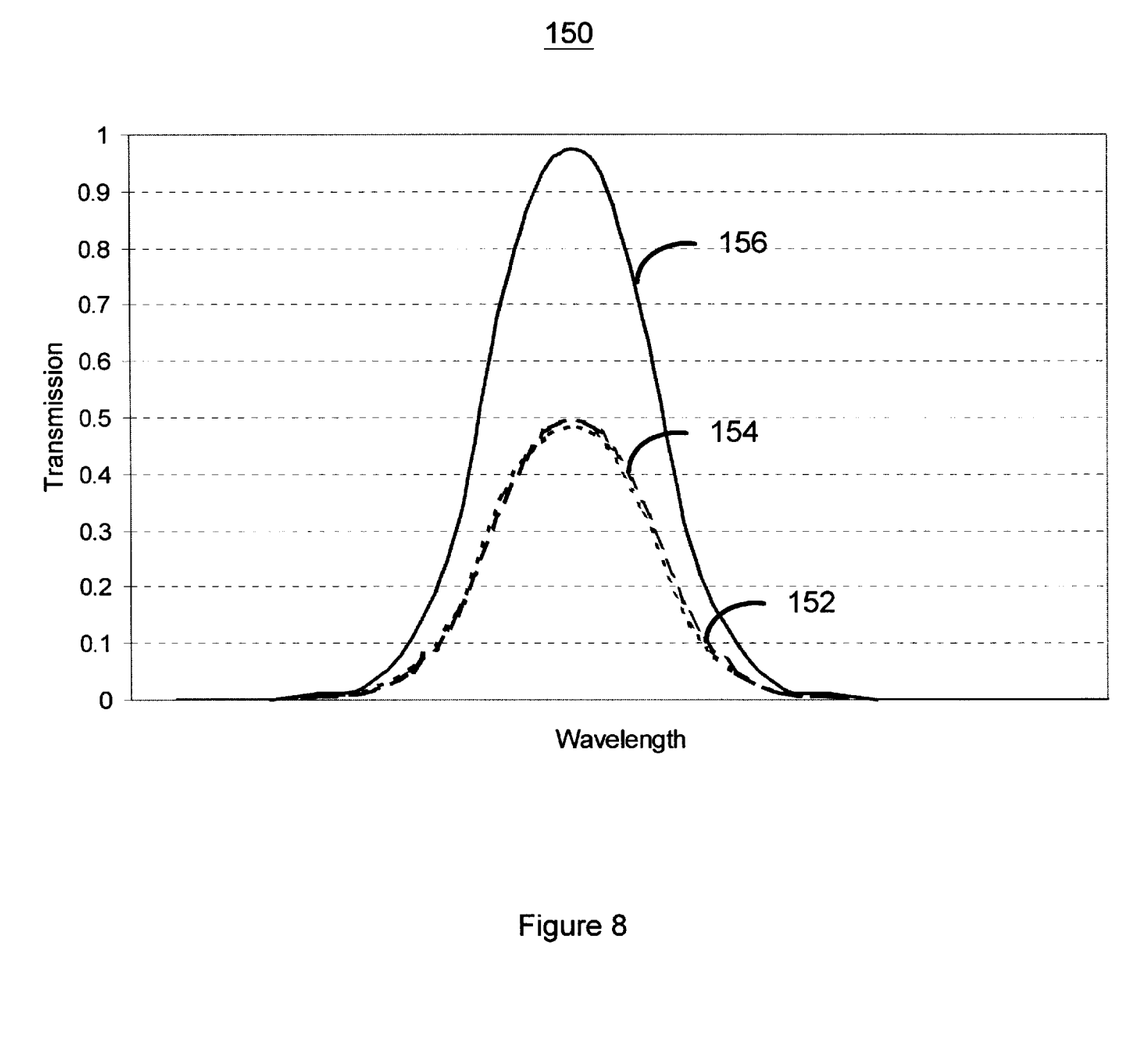
FIG. 8 is a diagram of the transmission spectrum for one embodiment of a system in accordance with the present invention for filtering an optical signal using the liquid crystal tunable filter.

Because of the above described features of the system 100, and more particularly the liquid crystal tunable filter unit 112, the system 100 has improved characteristics. FIG. 8 is a diagram of the transmission spectrum 150 for one embodiment of a system in accordance with the present invention for filtering an optical signal using the liquid crystal tunable filter. The curve 152 and 154 depicts the transmission spectrum for the components 124A and 124B, respectively. The curve 156 depicts the transmission spectrum for the output of a system 100. As can be seen in FIG. 8, the output of the liquid crystal tunable filter system 100 is significantly less subject to polarization dependence and polarization spectrum separation.

A method and system has been disclosed for a liquid crystal tunable filter system having a reduced polarization dependence and polarization spectrum separation. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for filtering an optical signal comprising:
   a polarization beam splitter for splitting the optical signal into a first component having a first polarization and a second component having a second polarization;
   a first rotator for rotating a polarization 45 degrees in a first direction, the first rotator receiving the first component from the beam splitter;
   liquid crystal tunable filter unit having a plurality of liquid crystal molecules, the plurality of liquid crystal molecules being aligned 45 degrees from a vertical direction, the first rotator being located between the liquid crystal tunable filter unit and the polarization beam splitter, the liquid crystal tunable filter unit receiving the first component from the first rotator and providing the second component to the first rotator;
   a second rotator for rotating a polarization 45 degrees opposite to the first direction, the liquid crystal being located between the first rotator and the second rotator, the second rotator receiving the first component from the first rotator and providing the second component to the liquid crystal tunable filter unit; and
   a first prism located in proximity to the second rotator, the first prism receiving the first component from the second rotator and providing the second component to the second rotator; and
   a second prism located in proximity to the beam splitter, the second prism receiving the first component from the first prism and providing the second component from the first beam splitter to the first prism.

2. The system of claim 1 wherein the first component and the second component both pass through the liquid crystal tunable filter unit at the same region of the liquid crystal tunable filter unit.

3. The system of claim 1 further comprising:
a first single fiber collimator for receiving the optical signal and providing the optical signal to the polarization beam splitter, the polarization beam splitter being located between the first single fiber collimator and the first rotator.

4. The system of claim 3 further comprising:
a second single fiber collimator for outputting a filtered optical signal, the polarization beam splitter being located between the second single fiber collimator and the second prism.

5. The system of claim 1 wherein the first rotator is a Faraday rotator.

6. The system of claim 5 wherein the second rotator is a Faraday rotator.

7. A method for providing an apparatus for filtering an optical signal comprising the steps of:
(a) providing a polarization beam splitter for splitting the optical-signal into a first component having a first polarization and a second component having a second polarization;
(b) providing a first rotator for rotating a polarization 45 degrees in a first direction, the first rotator receiving the first component from the beam splitter;
(c) providing liquid crystal tunable filter unit having a plurality of liquid crystal molecules aligned 45 degrees from a vertical direction, the first rotator being located between the liquid crystal tunable filter unit and the polarization beam splitter, the liquid crystal tunable filter unit receiving the first component from the first rotator and providing the second component to the first rotator;
(d) providing a second rotator for rotating a polarization 45 degrees opposite to the first direction, the liquid crystal being located between the first rotator and the second rotator, the second rotator receiving the first component from the first rotator and providing the second component to the liquid crystal tunable filter unit; and
(e) providing a first prism located in proximity to the second rotator, the first prism receiving the first component from the second rotator and providing the second component to the second rotator; and
(f) providing a second prism located in proximity to the beam splitter, the second prism receiving the first component from the first prism and providing the second component from the first beam splitter to the first prism.

8. The method of claim 7 wherein the first component and the second component both pass through the liquid crystal tunable filter at the same region of the liquid crystal tunable filter.

9. The method of claim 1 further comprising the steps of:
(g) providing a first single fiber collimator for receiving the optical signal and providing the optical signal to the polarization beam splitter, the polarization beam splitter being located between the first single fiber collimator and the first rotator.

10. The method of claim 9 further comprising:
(h) providing a second single fiber collimator for outputting a filtered optical signal, the polarization beam splitter being located between the second single fiber collimator and the second prism.

11. The method of claim 7 wherein the first rotator is a Faraday rotator.

12. The method of claim 11 wherein the second rotator is a Faraday rotator.

13. A method for filtering an optical signal comprising the steps of:
(a) splitting the optical signal into a first component having a first polarization and a second component having a second polarization;
(b) rotating the first polarization of the first component 45 degrees in a first direction;
(c) providing the first component to a liquid crystal tunable filter having a plurality of liquid crystal molecules aligned 45 degrees from a vertical direction, the first rotator being located between the liquid crystal tunable filter and the polarization beam splitter;
(d) rotating the first polarization by 45 degrees opposite to the first direction after transmission through the liquid crystal tunable filter unit;
(e) rotating the second polarization of the first component 45 degrees opposite to the first direction;
(f) providing the second component to the liquid crystal tunable filter unit, the second component being transmitted through the same portion of the surface of the liquid crystal tunable filter as the first component;
(g) rotating the second polarization by 45 degrees in the first direction after transmission through the liquid crystal tunable filter unit; and
(h) recombining the first component and the second component after steps (a) through (d) have been performed.

* * * * *